(12) United States Patent
Hu et al.

(10) Patent No.: US 11,880,105 B2
(45) Date of Patent: Jan. 23, 2024

(54) BACKLIGHT MODULE AND DISPLAY APPARATUS

(71) Applicant: HKC Corporation Limited, Guangdong (CN)

(72) Inventors: Xiaogang Hu, Guangdong (CN); Haijiang Yuan, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,040

(22) Filed: Dec. 28, 2022

(65) Prior Publication Data

US 2023/0400727 A1    Dec. 14, 2023

(30) Foreign Application Priority Data

Jun. 14, 2022   (CN) .......................... 202210665582.X (51) Int. Cl.
  *G02F 1/00*       (2006.01)
  *G02F 1/13357*    (2006.01)

(52) U.S. Cl.
  CPC .. *G02F 1/133603* (2013.01); *G02F 1/133606* (2013.01)

(58) Field of Classification Search
  None
  See application file for complete search history.

(56) References Cited

U.S. PATENT DOCUMENTS

2020/0166804 A1*  5/2020  Zheng ............... G02F 1/133608
2020/0233141 A1*  7/2020  Yang ................. G02F 1/133607
2020/0301202 A1*  9/2020  Cheng ............... G02F 1/133603
2020/0409217 A1* 12/2020  He .................... G02F 1/13338
2021/0165280 A1*  6/2021  Lee .................... G02F 1/133606
(Continued)

FOREIGN PATENT DOCUMENTS

CN       101514781 A      8/2009
CN       109326226 A      2/2019
(Continued)

OTHER PUBLICATIONS

Notice of the First Review Opinion dated Jan. 28, 2023 received in Chinese Patent Application No. CN 202210665582.X.

*Primary Examiner* — Gerald J Sufleta, II
(74) *Attorney, Agent, or Firm* — Scully, Scott, Murphy & Presser, P.C.

(57) ABSTRACT

A backlight module and a display apparatus are provided. The backlight module includes a lamp panel, multiple light-emitting elements, an encapsulation layer, and a fill-light structure. The lamp panel has multiple backlight regions and multiple fill-light regions each arranged between two adjacent backlight regions. The lamp panel has an integral structure. The multiple light-emitting elements are arranged in an array on each of the multiple backlight regions. A distance between two adjacent light-emitting elements disposed on both sides of the fill-light region is greater than a distance between two adjacent light-emitting elements disposed on a same side of the fill-light region. The encapsulation layer is disposed on the lamp panel and covers the multiple light-emitting elements. The fill-light structure is configured to adjust a tone parameter of the fill-light region to be within a tone-parameter range of the multiple backlight regions.

20 Claims, 4 Drawing Sheets

(56) References Cited

U.S. PATENT DOCUMENTS

2022/0221758 A1* 7/2022 Li ................... G02F 1/133606
2022/0326570 A1* 10/2022 Lee .................. G02F 1/133606

FOREIGN PATENT DOCUMENTS

| | | | |
|---|---|---|---|
| CN | 110349942 | A | 10/2019 |
| CN | 110361891 | A | 10/2019 |
| CN | 111445789 | A | 7/2020 |
| CN | 111915982 | A | 11/2020 |
| CN | 111999936 | A | 11/2020 |
| CN | 212694219 | U | 3/2021 |
| CN | 112863390 | A | 5/2021 |
| CN | 113835267 | A | 12/2021 |
| CN | 114137764 | A | 3/2022 |
| CN | 114203069 | A | 3/2022 |
| CN | 114415418 | A | 4/2022 |
| WO | 2021221905 | A1 | 11/2021 |

* cited by examiner

BACKLIGHT MODULE AND DISPLAY APPARATUS

CROSS-REFERENCE TO RELATED APPLICATIONS

This application claims priority under 35 U.S.C. § 119(a) to Chinese Patent Application No. 202210665582X, filed Jun. 14, 2022, the entire disclosure of which is incorporated herein by reference.

TECHNICAL FIELD

The disclosure relates to the field of display technology, and in particular, to a backlight module and a display apparatus.

BACKGROUND

In the related art, multiple lamp panels are usually spliced to form a backlight source of a large size, and edges of the lamp panels are prone to problems such as warpage, unevenness, fracture, light truncation, and cutting of black edges, which results in dark lines on joints of the lamp panels. Therefore, the joints have a brightness different from normal light-emitting regions, which affects the uniformity of the brightness of the backlight module. In addition, the expansion and contraction of lamp panels of a large size may lead to lamp damage or abnormal circuit conduction.

SUMMARY

In a first aspect, the disclosure provides a backlight module. The backlight module includes a lamp panel, multiple light-emitting elements, an encapsulation layer, and a fill-light structure. The lamp panel has multiple backlight regions and multiple fill-light regions each arranged between two adjacent backlight regions. The lamp panel has an integral structure. The multiple light-emitting elements are arranged in an array on each of the multiple backlight regions. A distance between two adjacent light-emitting elements disposed on both sides of the fill-light region is greater than a distance between two adjacent light-emitting elements disposed on a same side of the fill-light region. The encapsulation layer is disposed on the lamp panel and covers the multiple light-emitting elements. The fill-light structure is configured to adjust a tone parameter of the fill-light region to be within a tone-parameter range of the multiple backlight regions.

In a second aspect, the disclosure provides a display apparatus. The display apparatus includes a display panel and the above backlight module. The backlight module is disposed on a backlight surface of the display panel. The backlight module is configured to provide a light source to the display panel.

BRIEF DESCRIPTION OF THE DRAWINGS

In order to more clearly illustrate technical solutions of implementations of the disclosure or the related art, the following will briefly introduce drawings required for description of implementations or the related art. Obviously, the drawings in the following description are only some implementations of the disclosure. For those of ordinary skill in the art, other drawings can also be obtained from these drawings without creative effort.

The detailed description below will further illustrate the disclosure with reference to the drawings.

DETAILED DESCRIPTION

The following will clearly and completely describe technical solutions in implementations of the disclosure with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

It should be understood that the terms in the description, claims, and the drawings of the disclosure are merely for describing specific implementations, and are not intended to limit the disclosure. The terms "first", "second", and the like in the description, claims, and the drawings of the disclosure are configured to distinguish different objects, rather than to describe a specific order. The singular forms "a" and "the" are intended to include a plural form, unless the context clearly dictates otherwise. The term "comprising", "including", and any variations thereof are intended to cover non-exclusive inclusion. In addition, the disclosure can be implemented in many various forms, and is not limited to implementations described herein. The following specific implementations are provided for better and complete understanding of the disclosure, where words "up", "down", "left", "right", or the like that indicate orientations refer to the position of a structure illustrated in the corresponding drawing.

Preferred implementations of the disclosure are subsequently described in the description, but the description is for the purpose of explaining the general principles of the disclosure and is not intended to limit the scope of this disclosure. The scope of protection of the disclosure is defined by the appended claims.

Figure 1:
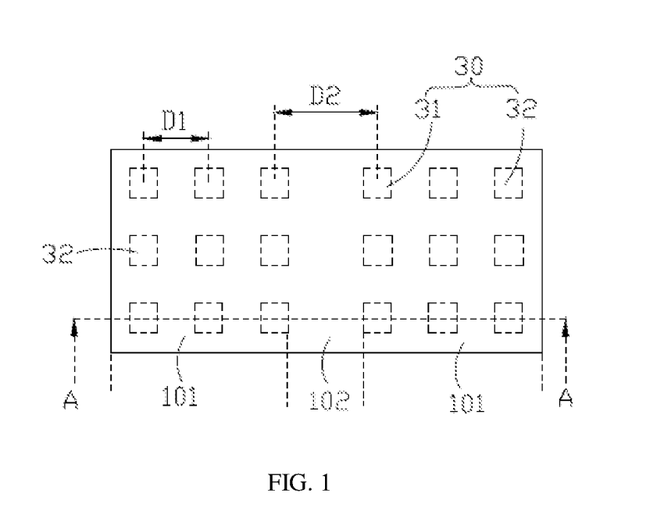
FIG. 1 is a top view of a backlight module provided in a first implementation of the disclosure.
Figure 2:
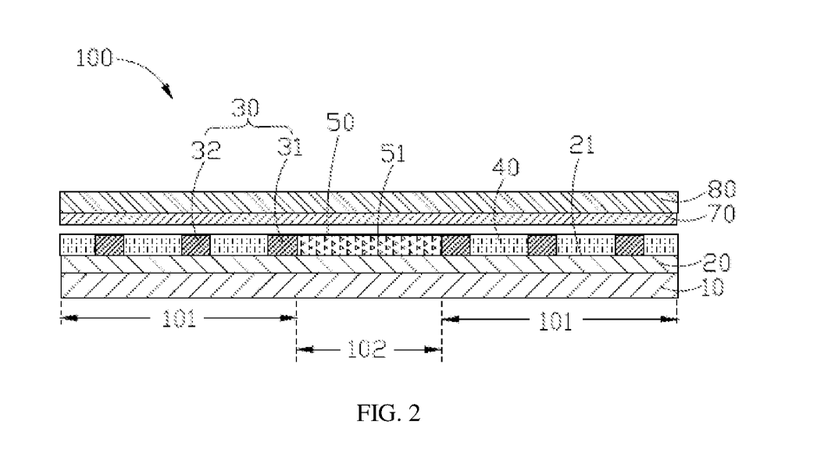
FIG. 2 is a cross-sectional view of the backlight module in FIG. 1 along line A-A.

Referring to FIGS. 1 and 2, FIG. 1 is a top view of a backlight module 100 provided in implementations of the disclosure, and FIG. 2 is a cross-sectional view of the backlight module 100 in FIG. 1 along line A-A. The backlight module 100 includes a lamp panel 20, multiple light-emitting elements 30, an encapsulation layer 40, and a fill-light structure 50. The lamp panel 20 has multiple backlight regions 101 and multiple fill-light regions 102 each arranged between two adjacent backlight regions 101. The lamp panel 20 has an integral structure. The multiple light-emitting elements 30 are arranged in an array on the multiple backlight regions 101. A distance D2 between two adjacent light-emitting elements 30 disposed on both sides of the fill-light region 102 is greater than a distance D1 between two adjacent light-emitting elements 30 disposed on a same side of the fill-light region 102. The encapsulation layer 40 is disposed on the lamp panel 20 and covers the multiple light-emitting elements 30. The fill-light light structure 50 is configured to adjust a tone parameter of the fill-light region 102 to be within a tone-parameter range of the multiple backlight regions 101.

In the backlight module 100 provided in implementations of the disclosure, the lamp panels 20 has an integral structure, so as to avoid the existing problem of dark lines on joints of lamp panels 20 resulted from the splicing of the lamp panels 20. However, when the lamp panel 20 is of a large size, the expansion and contraction of the integrally formed lamp panel 20 may result in lamp damage or abnormal circuit conduction. In the disclosure, the lamp panel 20 is divided into multiple backlight regions 101, the distance between two adjacent light-emitting elements 30 disposed on both sides of the fill-light region 102 is designed to be greater than the distance between two adjacent light-emitting elements 30 disposed on the same side of the fill-light light region 102, the multiple fill-light regions 102 each are arranged between two adjacent backlight regions 101, and the tone parameter of the fill-light region 102 is adjusted to be within the tone-parameter range of the multiple backlight regions 101 with aid of the fill-light structure 50, thereby avoiding the problem of lamp damage or abnormal circuit conduction resulted from the expansion and contraction of the lamp panel 20, and improving the display effect and the display quality of the display apparatus.

It should be understood by those skilled in the art that, FIG. 1 merely illustrates an example of the backlight module 100 and does not constitute a limitation on the backlight module 100. The backlight module 100 may include more or less components than those illustrated in FIG. 1, or combine certain components or different components. For example, the backlight module 100 may also include electrical connectors and the like.

In implementations, multiple light-emitting elements 30 are welded on the lamp panel 20. The lamp panel 20 is a Printed Circuit Board (PCB) substrate, so as to avoid using messy connecting cables for light-emitting elements 30, thereby ensuring good conduction effect between the light-emitting element 30 and the lamp panel 20. In some implementations, the lamp panel 20 may also be an existing substrate, and the multiple light-emitting elements 30 may be electrically connected to a power supply or other functional elements via connecting cables.

Multiple light-emitting elements 30 are arranged in an array on each backlight region 101. The light-emitting element 30 includes but is not limited to a Light-Emitting Diode (LED), a mini LED, and the like. In implementations, the multiple light-emitting elements 30 are each mini LEDs. The multiple light-emitting elements 30 includes multiple first backlight units 31 and multiple second backlight units 32. The multiple first backlight units 31 are disposed on both sides of the fill-light region 102 and are close to the fill-light region 102. The multiple second backlight units 32 are spaced apart from the fill-light region 102 by the first backlight units 31 and are away from the fill-light region 102. In implementations, the first backlight unit 31 has a brightness equal to the second backlight unit 32.

The fill-light structure 50 is implemented as a fill-light layer 51. The fill-light layer 51 is disposed on the lamp panel 20 and is in the fill-light region 102. The fill-light layer 51 is a fluorescent layer or a quantum dot layer, thereby improving the light emission effect of the backlight module 100. In some other implementations, the fill-light structure 50 may include a fill-light layer and a fill-light unit covered by the fill-light layer, or the fill-light structure 50 may only include a fill-light unit, which may refer to the description of following implementations for details. Optionally, the brightness of the fill-light layer 51 gradually decreases from the center of the fill-light layer 51 to the surrounding, so as to avoid chromatic aberration between the fill-light region 102 and the backlight region 101, thereby ensuring that the tone of the backlight module 100 in the fill-light region 102 is consistent with the backlight region 101, improving the brightness of the fill-light region 102, and ensuring the light emission quality of the backlight module 100. Specifically, the fill-light layer 51 may be made of fill-light material, and the density of the fill-light material gradually decreases from the center of the fill-light layer 51 to the surrounding. It should be noted that, the size of the fill-light region 102 or the distance D2 between two adjacent light-emitting elements 30 disposed on both sides of the fill-light region 102 can be designed according to factors such as the size of the backlight region 101, the distribution of the light-emitting elements 30, and the lamp panel 20, which is not limited herein. In implementations, the fill-light region 102 corresponds to a region where all of the light-emitting elements 30 on the lamp panel 20 can be turned on upon the expansion and contraction of the lamp panel 20, so as to avoid the problem of lamp damage or circuit conduction failure resulted from the expansion and contraction of the lamp panel 20.

The fill-light layer 51 is arranged in the fill-light region 102, when the light-emitting elements 30 of the backlight module 100 are turned on, lights emitted by light-emitting elements 30 disposed on both sides of the fill-light region 102 can enter the fill-light layer 51, and excite a fluorescent powder or quantum dot particles in the fill-light layer 51 to emit lights, thereby increasing the intensity of the fill-light region 102, so that the tone of the fill-light region 102 is approximately the same as the tone of the backlight region 101, and the brightness of the fill-light region 102 is approximately the same as the brightness of the backlight region 101, which avoids chromatic aberration in the fill-light region 102, thereby alleviating the problem of uneven brightness in the fill-light region 102 and improving the light emission quality of the backlight module 100.

In implementations, the fill-light layer 51 is seamlessly connected with the encapsulation layer 40 to form an integral structure, so as to ensure a smooth brightness transition of the lamp panel 20 and thus a uniform brightness of the backlight module 100. The fill-light layer 51 and the encapsulation layer 40 are coplanar on one side away from the lamp panel 20, so as to ensure a flat appearance of the backlight module 100, and the scratching of the encapsulation layer 40 and/or the fill-light layer 51 disposed on the lamp panel 20 can be avoided during assembly. In implementations, a thickness of the fill-light layer 51 is the same as a thickness of the encapsulation layer 40. In some other implementations, the thickness of the fill-light layer 51 is smaller than the thickness of the encapsulation layer 40.

In some implementations, encapsulation layers 40 in adjacent backlight regions 101 are spaced apart by the fill-light layer 51. Specifically, the encapsulation layer 40 of each backlight region 101 is disposed on the lamp panel 20 and covers the light-emitting elements 30 in the corresponding backlight region 101, so as to avoid lamp damage resulted from the scratching of the light-emitting elements 30 during disassembly and assembly. The encapsulation layer 40 of each backlight region 101 has an integral structure, thereby simplifying the manufacturing process. In some other implementations, the encapsulation layer 40 has an integral structure. Specifically, the encapsulation layer 40 is disposed on the lamp panel 20 and covers the multiple light-emitting elements 30 and the fill-light layer 51, thereby enhancing the connection stability between the encapsulation layer 40 and the light-emitting elements 30, and avoiding lamp damage resulted from the scratching of the light-emitting elements 30 during disassembly and assembly.

In implementations, the backlight module 100 further includes a backplane 10. The lamp panel 20 is disposed on the backplane 10. The backlight module 100 further includes a diffuser plate 70 and an optical film 80 sequentially stacked on one side of the encapsulation layer 40 away from the lamp panel 20. Specifically, the diffuser plate 70 is disposed above the lamp panel 20 and covers multiple light-emitting elements 30, so that when lights emitted by the light-emitting elements 30 reaches the diffuser plate 70, some of the lights are refracted, reflected, and scattered by a light-diffusing agent in the diffuser plate 70, so as to ensure the purity of lights passing through the diffuser plate 70. The diffuser plate 70 is made of a material including but not limited to Polycarbonate (PC), Polymethyl Methacrylate (PMMA), Polyethylene Terephthalate (PET), Polyvinyl Chloride (PVC) resin, a light-diffusing agent, and an additive, etc. The optical film 80 and the diffuser plate 70 can be fully bonded and fixed by optical glue, so as to prevent the optical film 80 and the diffuser plate 70 from bending which affects the optical distance.

A reflective layer 21 is disposed on the lamp panel 20. The reflective layer 21 is configured to reflect lights emitted by the light-emitting elements 30 to the diffuser plate 70, so as to improve the light emission effect of the backlight module 100. The reflective layer 21 is made of a material including diffusing particles. The diffusing particles include but are not limited to at least one of: $SiO_2$, $TiO_2$, Au, Ag, Al, Cu, Zn, Pt, Co, Ni, $Cu_2O$, CuO, CdO, ZnO, and glass fibers. In implementations, the reflective layer 21 is disposed on a region of the lamp panel 20 not covered by the light-emitting elements 30. In some implementations, the reflective layer 21 may be disposed on one side of the lamp panel 20 away from the light-emitting elements 30.

Figure 3:
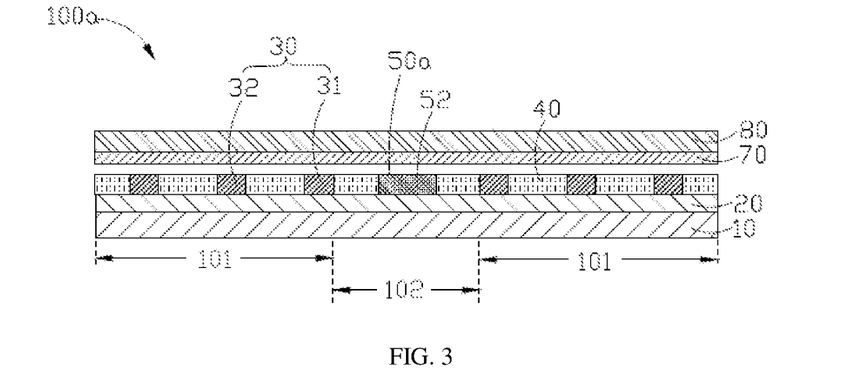
FIG. 3 is a cross-sectional view of a backlight module provided in a second implementation of the disclosure.

Referring to FIGS. 1 and 3, FIG. 3 is a schematic top view of a backlight module 100a provided in a second implementation of the disclosure. In the second implementation, the structure of the backlight module 100a is similar to the structure of the backlight module 100 of the first implementation except that the fill-light structure 50a of the backlight module 100a only includes a fill-light unit 52.

The fill-light unit 52 includes but is not limited to a LED or a mini LED. The fill-light unit 52 is disposed on the lamp panel 20 at a position corresponding to the fill-light region 102. The fill-light unit 52 is disposed in the middle of the fill-light region 102 and spaced apart from the first backlight unit 31 of the light-emitting element 30. In implementations, the fill-light unit 52 is covered by the encapsulation layer 40, and the encapsulation layer 40 covers at least part of the fill-light region 102. Specifically, the encapsulation layer 40 has an integral structure. The encapsulation layer 40 is disposed on the lamp panel 20 and covers all the first backlight units 31, the second backlight units 32, and the fill-light unit 52. In some other implementations, the fill-light unit 52 is covered by the fill-light layer, and the fill-light layer covers at least part of the fill-light region 102. The brightness, the quantity, and/or the size of the fill-light unit 52 can be designed according to the size of the fill-light region 102 or the distance D2 between two adjacent light-emitting elements 30 disposed on both sides of the fill-light region 102, which is not limited herein. For example, the size of the fill-light unit 52 is larger than, equal to, or smaller than each of the size of the first backlight unit 31 and the size of the second backlight unit 32. The brightness of the fill-light unit 52 is higher than, equal to, or lower than each of the brightness of the first backlight unit 31 and the brightness of the second backlight unit 32. For example, the larger the fill-light region, the higher the brightness of the fill-light unit 52. Optionally, the fill-light unit 52 may be arranged on the fill-light region 102 in each array row or different array rows of the backlight region 101.

It should be noted that, for the specific structure of the backlight region 101, reference may be made to the description of the backlight region 101 of the first implementation, which will not be repeated herein.

Figure 4:
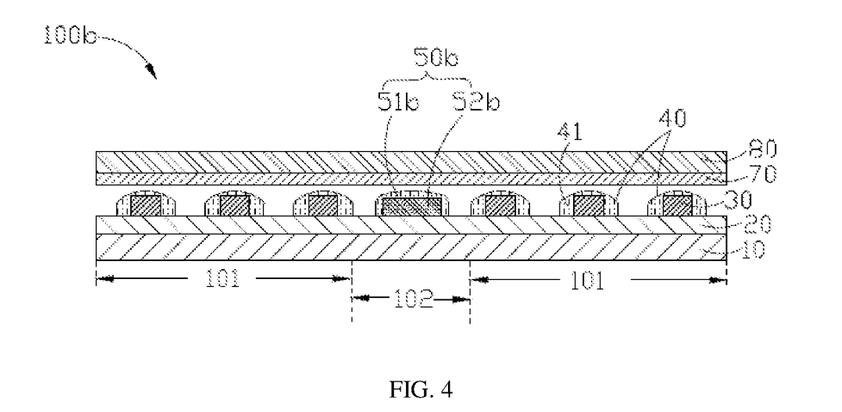
FIG. 4 is a cross-sectional view of a backlight module provided in a third implementation of the disclosure.

Referring to FIGS. 1 and 4, FIG. 4 is a schematic top view of a backlight module 100b provided in a third implementation of the disclosure. In the third implementation, the structure of the backlight module 100b is similar to the structure of the backlight module 100 of the first implementation except that the fill-light structure 50b of the backlight module 100b only includes a fill-light unit 52b.

The encapsulation layer 40 includes multiple encapsulation bodies 41 spaced apart from one another. The encapsulation bodies 41 are configured to encapsulate a preset number of light-emitting elements 30. The preset number is, for example, 1, 2, 3, etc., which is not limited herein. In implementations, multiple light-emitting elements 30 are respectively encapsulated by different encapsulation bodies 41, which prevents lamp damage resulted from the scratching of the light-emitting elements 30 during disassembly and assembly, and facilitates the repair or replacement of damaged light-emitting elements 30, thereby reducing the manufacturing cost of the encapsulation bodies 41 and thus the manufacturing cost of the backlight module 100b. The encapsulation bodies 41 can be formed outside the light-emitting elements 30 by contact or non-contact dispensing, and encapsulate the light-emitting elements 30 on the lamp panel 20, so as to avoid the abrasion of the light-emitting elements 30.

In implementations, the encapsulation bodies 41 may also be configured to encapsulate the fill-light structure 52b. In some other implementations, the fill-light structure 50b may further be encapsulated with a fill-light layer 51b, and the fill-light layer 51b is spaced apart from the encapsulation body 41, so as to further improve the light emission effect of the fill-light structure, thereby ensuring that the tone in the fill-light region 102 is consistent with the backlight region 101 and ensuring the light emission quality of the backlight module 100b.

It should be noted that, for the specific structure of the backlight region 101, reference may be made to the description of the backlight region 101 of the first implementation, which will not be repeated herein.

Figure 5:
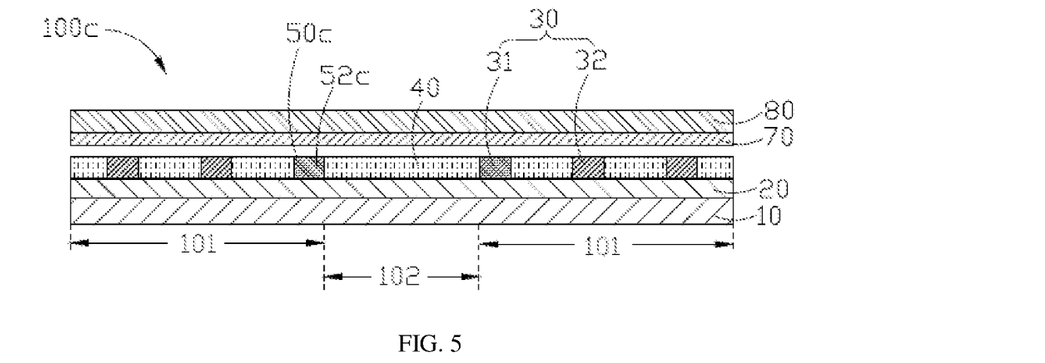
FIG. 5 is a cross-sectional view of a backlight module provided in a fourth implementation of the disclosure.

Referring to FIGS. 1 and 5, FIG. 5 is a schematic top view of a backlight module 100c provided in a fourth implementation of the disclosure. In the fourth implementation, the structure of the backlight module 100c is similar to the structure of the backlight module 100 of the first implementation except that the fill-light structure 50c of the backlight module 100c only includes a fill-light unit 52c. The fill-light unit 52c is implemented as the first backlight unit 31. The first backlight unit 31 has a brightness greater than the second backlight unit 32.

In implementations, the encapsulation layer 40 has an integral structure. The fill-light region 102 is covered by the encapsulation layer 40. In some other implementations, the fill-light region 102 is covered by the fill-light layer 51. Each of the first backlight units 31 is adjacent to the fill-light region 102. In some other implementations, some of the first backlight units 31 are disposed adjacent to the fill-light region 102, and remaining first backlight units 31 are spaced apart from the fill-light region 102. The brightness of the first backlight unit 31 gradually decreases along a direction from the fill-light region 102 to the backlight region 101, so as to avoid chromatic aberration between the fill-light region 102 and the adjacent backlight region 101, thereby improving the brightness of the fill-light region 102, and ensuring that the tone of the backlight module 100c in the fill-light region 102 is consistent with the backlight region 101, so that the display panel 200 has a good display effect.

Figure 6:
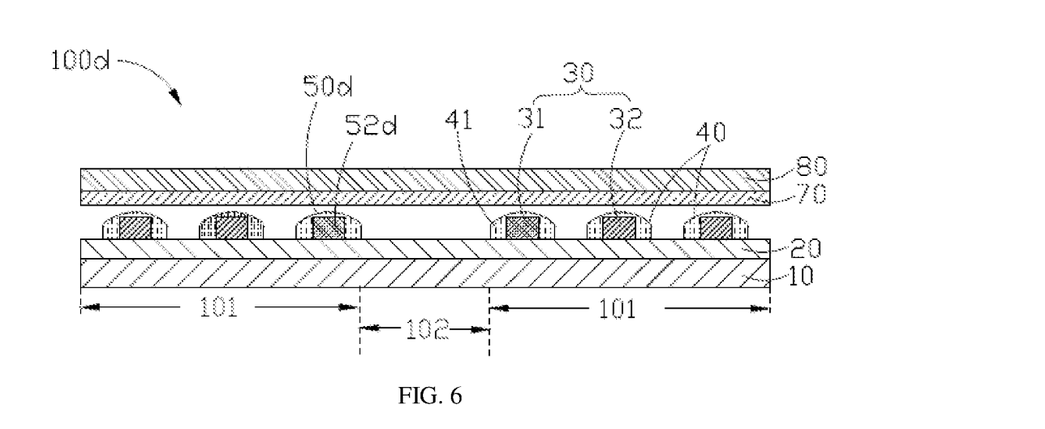
FIG. 6 is a cross-sectional view of a backlight module provided in a fifth implementation of the disclosure.

Referring to FIGS. 1 and 6, FIG. 6 is a schematic top view of a backlight module 100d provided in a fifth implementation of the disclosure. In the fifth implementation, the structure of the backlight module 100d is similar to the structure of the backlight module 100c of the fourth implementation except that the encapsulation layer 40 includes multiple encapsulation bodies 41 spaced apart from one another. The fill-light region 102 is not covered by the encapsulation layer 40 or the fill-light layer.

Specifically, the first backlight units 31 and the second backlight units 32 are encapsulated by different encapsulation bodies 41, which avoids lamp damage resulted from the scratching of the first backlight units 31 and the second backlight units 32 during disassembly and assembly, and reduces the manufacturing cost of the encapsulation bodies 41 and thus the manufacturing cost of the backlight module 100d. In some implementations, the encapsulation body 41 encapsulating the first backlight unit is implemented as the fill-light layer 51, which further improves the brightness of the first backlight unit and thus the brightness of the fill-light region 102, thereby ensuring that the tone of the backlight module 100d in the fill-light region 102 is consistent with the backlight region 101, so as to ensure the display effect and the display quality of the backlight module 100d.

Figure 7:
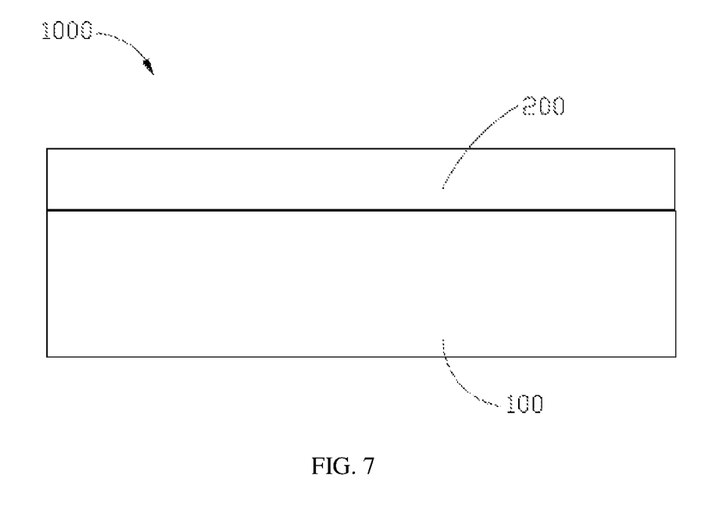
FIG. 7 is a schematic structural diagram of a display apparatus provided in implementations of the disclosure.

Referring to FIGS. 1 and 7, FIG. 7 is a schematic structural diagram of a display apparatus 1000 provided in implementations of the disclosure. The display apparatus 1000 includes a display panel 200 and the backlight module 100 of the first implementation. The backlight module 100 is disposed on a backlight surface of the display panel 200. The backlight module 100 is configured to provide a light source to the display panel 200. The display panel 200 is disposed on the optical film 80. The display panel 200 and the optical film 80 can be bonded and fixed by optical glue. The display panel 200 may be spaced apart from the optical film 80 by a supporting structure. The brightness of the backlight module is uniform, therefore the display panel 200 has a good display effect. It should be noted that the backlight module may also be implemented as the backlight module 100a, 100b, 100c, or 100d of the second implementation to the fifth implementation.

The technical solutions of the disclosure can be widely used in various display panels 200, such as Twisted Nematic (TN) display panels, In-Panel Switching (IPS) display panels, Vertical Alignment (VA) display panels, Multi-Domain Vertical Alignment (MVA) display panels, or other types of display panels, such as Liquid Crystal Display (LCD) panels, Organic Light-Emitting Diode (OLED) display panels, to which the above solutions are applicable.

It should be noted that the concept of the disclosure can form a lot of implementations, but the length of the disclosure is limited and it is not possible to list these implementations one by one. Therefore, the above implementations or technical features can be combined arbitrarily to form new implementations without conflict, and original technical effects will be enhanced through the combination of implementations or technical features.

Implementations of the disclosure have been introduced in detail above, and the principles and implementations of the disclosure are described in the disclosure with specific examples. Descriptions of implementations are only configured to help understand methods and core ideas of the disclosure. In addition, those of ordinary skill in the art may have changes in specific implementations and application scope based on the idea of the disclosure. In conclusion, the content of the disclosure should not be construed as a limitation.

What is claimed is:

1. A backlight module, comprising:
   a lamp panel having a plurality of backlight regions and a plurality of fill-light regions each arranged between two immediately adjacent backlight regions, wherein the lamp panel has an integral structure;
   a plurality of light-emitting elements arranged in an array on each of the plurality of backlight regions, wherein a distance between two immediately adjacent light-emitting elements disposed on opposite sides of the fill-light region between two immediately adjacent backlight regions is greater than a distance between two immediately adjacent light-emitting elements disposed on a same side of the fill-light region;
   an encapsulation layer disposed on the lamp panel and covering the plurality of light-emitting elements; and
   a fill-light structure configured to adjust a tone parameter of the fill-light region to be within a tone-parameter range of the plurality of backlight regions.

2. The backlight module of claim 1, wherein the fill-light structure comprises a fill-light unit and a fill-light layer, wherein
   the fill-light unit is disposed on the lamp panel at a position corresponding to the fill-light region and is covered by the encapsulation layer or the fill-light layer, or the plurality of light-emitting elements comprise first backlight units and second backlight units, the first backlight units are disposed on both sides of the fill-light region and are close to the fill-light region, the second backlight units are spaced apart from the fill-light region by the first backlight units and are away from the fill-light region, the fill-light unit is implemented as the first backlight unit, and the first backlight unit has a brightness greater than the second backlight unit; and
   the fill-light layer is disposed on the lamp panel and is in the fill-light region, and the fill-light layer is a fluorescent layer or a quantum dot layer.

3. The backlight module of claim 2, wherein each of the first backlight units is adjacent to the fill-light region; or
   a portion of the first backlight units are disposed adjacent to the fill-light region, and a remaining portion of the first backlight units are spaced apart from the fill-light region, and the brightness of the first backlight unit gradually decreases along a direction from the fill-light region to the backlight region.

4. The backlight module of claim 2, wherein the fill-light layer is seamlessly connected with the encapsulation layer to form an integral structure, or the fill-light layer is spaced apart from the encapsulation layer.

5. The backlight module of claim 2, wherein the fill-light layer and the encapsulation layer are coplanar on one side of the lamp panel.

6. The backlight module of claim 2, wherein a thickness of the fill-light layer is the same as a thickness of the encapsulation layer.

7. The backlight module of claim 1, wherein the encapsulation layer comprises a plurality of encapsulation bodies spaced apart from one another, the encapsulation bodies are configured to encapsulate a preset number of light-emitting elements.

8. The backlight module of claim 7, wherein the encapsulation bodies are further configured to encapsulate the fill-light structure.

9. The backlight module of claim 1, wherein the encapsulation layer has an integral structure.

10. The backlight module of claim 1, further comprising a diffuser plate and an optical film sequentially stacked on one side of the encapsulation layer away from the lamp panel.

11. A display apparatus, comprising:
a display panel; and
a backlight module comprising:
a lamp panel having a plurality of backlight regions and a plurality of fill-light regions each arranged between two immediately adjacent backlight regions, wherein the lamp panel has an integral structure;
a plurality of light-emitting elements arranged in an array on each of the plurality of backlight regions, wherein a distance between two immediately adjacent light-emitting elements disposed on opposite sides of the fill-light region between two immediately adjacent backlight regions is greater than a distance between two immediately adjacent light-emitting elements disposed on a same side of the fill-light region;
an encapsulation layer disposed on the lamp panel and covering the plurality of light-emitting elements; and
a fill-light structure configured to adjust a tone parameter of the fill-light region to be within a tone-parameter range of the plurality of backlight regions, wherein
the backlight module is disposed on a backlight surface of the display panel, and the backlight module is configured to provide a light source to the display panel.

12. The display apparatus of claim 11, wherein the fill-light structure comprises a fill-light unit and a fill-light layer, wherein
the fill-light unit is disposed on the lamp panel at a position corresponding to the fill-light region and is covered by the encapsulation layer or the fill-light layer, or the plurality of light-emitting elements comprise first backlight units and second backlight units, the first backlight units are disposed on both sides of the fill-light region and are close to the fill-light region, the second backlight units are spaced apart from the fill-light region by the first backlight units and are away from the fill-light region, the fill-light unit is implemented as the first backlight unit, and the first backlight unit has a brightness greater than the second backlight unit; and
the fill-light layer is disposed on the lamp panel and is in the fill-light region, and the fill-light layer is a fluorescent layer or a quantum dot layer.

13. The display apparatus of claim 12, wherein each of the first backlight units is adjacent to the fill-light region; or
a portion of the first backlight units are disposed adjacent to the fill-light region, and a remaining portion of the first backlight units are spaced apart from the fill-light region, and the brightness of the first backlight unit gradually decreases along a direction from the fill-light region to the backlight region.

14. The display apparatus of claim 12, wherein the fill-light layer is seamlessly connected with the encapsulation layer to form an integral structure, or the fill-light layer is spaced apart from the encapsulation layer.

15. The display apparatus of claim 12, wherein the fill-light layer and the encapsulation layer are coplanar on one side of the lamp panel.

16. The display apparatus of claim 12, wherein a thickness of the fill-light layer is the same as a thickness of the encapsulation layer.

17. The display apparatus of claim 11, wherein the encapsulation layer comprises a plurality of encapsulation bodies spaced apart from one another, the encapsulation bodies are configured to encapsulate a preset number of light-emitting elements.

18. The display apparatus of claim 17, wherein the encapsulation bodies are further configured to encapsulate the fill-light structure.

19. The display apparatus of claim 11, wherein the encapsulation layer has an integral structure.

20. The display apparatus of claim 11, further comprising a diffuser plate and an optical film sequentially stacked on one side of the encapsulation layer away from the lamp panel.

* * * * *